(12) United States Patent
Smith

(10) Patent No.: US 11,260,842 B2
(45) Date of Patent: Mar. 1, 2022

(54) ELECTRICALLY ACTUATED MECHANICAL PARK BRAKE SYSTEM

(71) Applicant: Club Car LLC, Evans, GA (US)

(72) Inventor: Nathan Smith, Evans, GA (US)

(73) Assignee: CLUB CAR, LLC, Evans, GA (US)

( * ) Notice: Subject to any disclaimer, the term of this patent is extended or adjusted under 35 U.S.C. 154(b) by 40 days.

(21) Appl. No.: 16/723,188

(22) Filed: Dec. 20, 2019

(65) Prior Publication Data
US 2021/0188238 A1    Jun. 24, 2021

(51) Int. Cl.
*B60T 13/74* (2006.01)
*B60T 7/02* (2006.01)
(Continued)

(52) U.S. Cl.
CPC .............. *B60T 13/746* (2013.01); *B60T 7/02* (2013.01); *B60T 11/046* (2013.01); *B60W 10/04* (2013.01);
(Continued)

(58) Field of Classification Search
CPC ........ B60T 13/746; B60T 7/02; B60T 11/046; B60T 2201/06; B60T 2220/04; B60T 2250/00; B60W 10/04; B60W 10/182; B60W 30/18109; B60W 30/18118; B60W 2510/0657; B60W 2510/083;
(Continued)

(56) References Cited

U.S. PATENT DOCUMENTS 6,213,259 B1 *   4/2001   Hanson ................... B60T 7/107
                                                    188/156
6,533,082 B2 *   3/2003   Gill ......................... B60T 7/107
                                                    188/156
(Continued)

FOREIGN PATENT DOCUMENTS

EP    3483017 A1    5/2019
FR    2888808 A1    1/2007
(Continued)

OTHER PUBLICATIONS

Extended European Search Report for European Patent Application No. 20215346.6 dated May 25, 2021, 10 pages.

*Primary Examiner* — Tisha D Lewis
(74) *Attorney, Agent, or Firm* — Edell, Shapiro & Finnan, LLC

(57) ABSTRACT

A park brake system for adjusting a tension in a brake cable that is coupled to a park brake. The park brake system can include a driver that is communicatively coupled to a microcontroller, and an actuator that is rotatably displaceable by operation of the driver. An equalizer assembly can be linearly displaced along the rotating actuator to adjust a tension in the brake cable. The microcontroller can monitor a current being drawn by the driver as the driver is operated, and generate instructions to cease operation of the driver upon the current reaching a predetermined current threshold that corresponds a maximum force that is to be applied by the park brake. The microcontroller can also, when the park brake is being released from a set position, count pulses (Continued)

outputted by an encoder in connection with determining whether the park brake has reached a running clearance position.

20 Claims, 5 Drawing Sheets

(51) Int. Cl.
| | | |
|---|---|---|
| *B60T 11/06* | (2006.01) | |
| *B60W 10/18* | (2012.01) | |
| *B60W 30/18* | (2012.01) | |
| *B60T 11/04* | (2006.01) | |
| *B60W 10/04* | (2006.01) | |
| *F16C 1/16* | (2006.01) | |
| *F16D 65/28* | (2006.01) | |
| *F16D 121/24* | (2012.01) | |
| *F16D 125/60* | (2012.01) | |
| *F16D 127/02* | (2012.01) | |

(52) U.S. Cl.
CPC .... *B60W 10/182* (2013.01); *B60W 30/18109* (2013.01); *B60W 30/18118* (2013.01); *F16C 1/16* (2013.01); *F16D 65/28* (2013.01); *B60T 2201/06* (2013.01); *B60T 2220/04* (2013.01); *B60T 2250/00* (2013.01); *B60W 2510/0657* (2013.01); *B60W 2510/083* (2013.01); *B60W 2510/09* (2013.01); *B60W 2510/1005* (2013.01); *B60W 2520/16* (2013.01); *B60W 2540/10* (2013.01); *B60W 2710/186* (2013.01); *B60Y 2300/18116* (2013.01); *F16C 2361/45* (2013.01); *F16D 2121/24* (2013.01); *F16D 2125/60* (2013.01); *F16D 2127/02* (2013.01)

(58) Field of Classification Search
CPC ..... B60W 2510/09; B60W 2510/1005; B60W 2520/16; B60W 2540/10; B60W 2710/186; F16C 1/16; F16C 2361/45; F16D 65/28; F16D 2121/24; F16D 2125/60; F16D 2127/02
See application file for complete search history.

(56) References Cited

U.S. PATENT DOCUMENTS

| | | |
|---|---|---|
| 8,235,181 B2 | 8/2012 | Sano et al. |
| 9,174,622 B2 | 11/2015 | Shiraki |
| 2002/0100647 A1 | 8/2002 | Miyakawa et al. |
| 2004/0016612 A1* | 1/2004 | Iwagawa ................ B60T 7/107 188/265 |
| 2004/0113486 A1 | 6/2004 | Koga et al. |
| 2009/0193922 A1* | 8/2009 | Hayashi .................... F16C 1/12 74/473.12 |
| 2009/0247364 A1* | 10/2009 | Sano ................... F16H 25/2021 477/197 |
| 2017/0291585 A1* | 10/2017 | Kobune ................ B60T 13/741 |

FOREIGN PATENT DOCUMENTS

| | | |
|---|---|---|
| JP | 4928085 B2 | 5/2012 |
| KR | 20100039075 A | 4/2010 |
| WO | 9943968 A1 | 9/1999 |

* cited by examiner

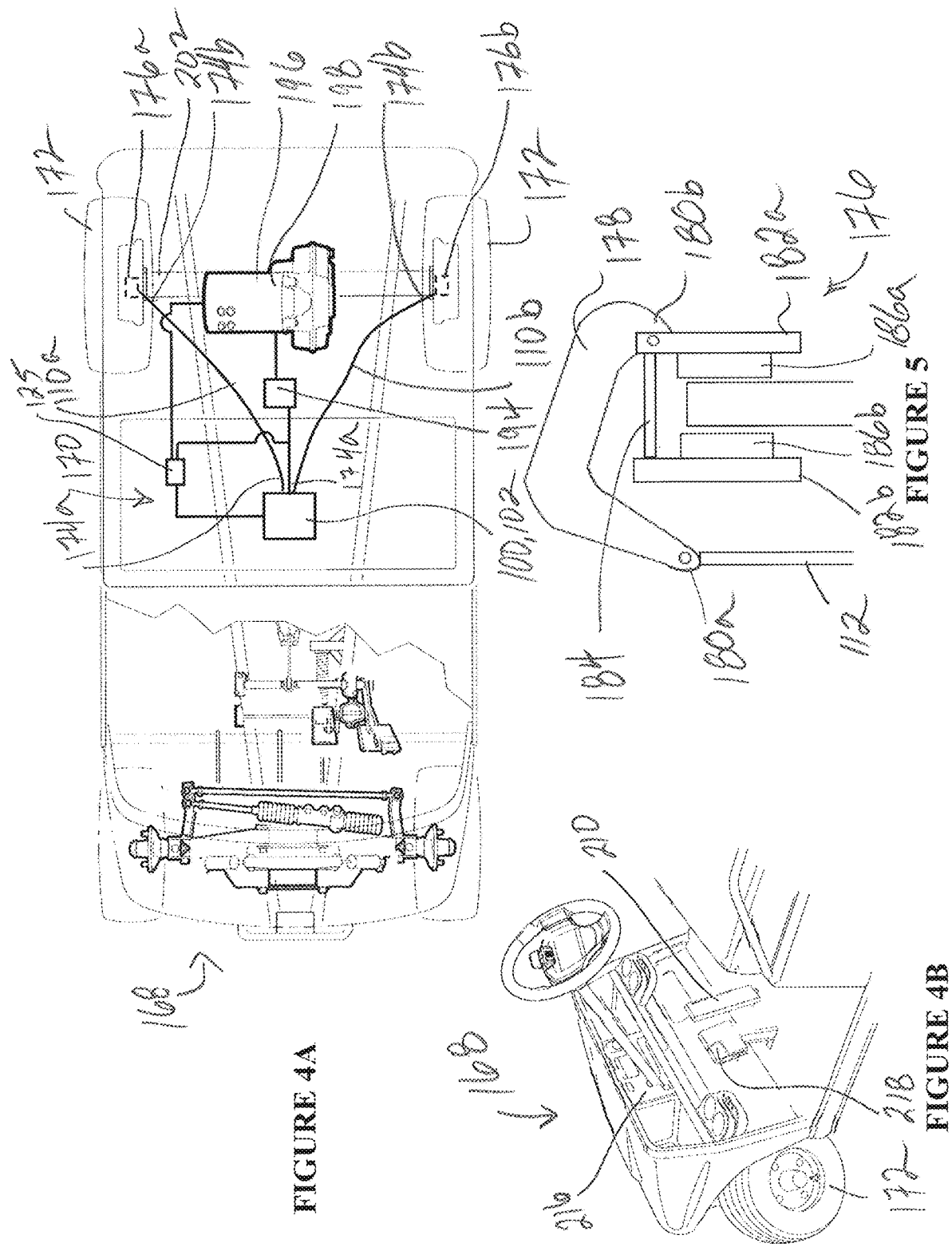

ELECTRICALLY ACTUATED MECHANICAL PARK BRAKE SYSTEM

BACKGROUND

Embodiments of the present invention generally relate to braking systems for vehicles. More particularly, but not exclusively, embodiments of the present invention relate to electrically actuated mechanical braking systems.

Vehicles often include a park brake and a service brake. Park brakes traditionally are used to at least assist, when the park brake is set, in holding a position of a parked vehicle, including, for example, holding a position of the vehicle when the vehicle is parked on an incline. Traditionally, mechanical park brakes are set by a driver of the vehicle pulling or pushing on a ratcheting hand lever or pedal. Yet, with at least certain types of parking brakes, if the park brake is only partially set, also referred to a light brake setting, the vehicle may be continue to be drivable and the ability of the park brake to hold the position of the vehicle may be diminished. Thus, a user may not at least initially detect or realize that the park brake is partially set as the user drives the vehicle. Yet, driving the vehicle while the parking brake is at least partially engaged can cause a number of issues for the vehicle and the brake system, including, for example, damage and/or premature wear to the brake system, vehicle motor, and/or transmission.

With respect to service brakes, service brakes are often used to reduce a speed of the moving vehicle and/or to bring the moving vehicle to a stopped position. Thus, in at least certain situations, whether a vehicle moves can be controlled by the extent that the user holds or depresses the service brake. However, in at least certain situations, a vehicle that is positioned along an incline may, as soon as the service brake is released, the vehicle can begin rolling in a rearward direction down the incline, regardless of whether the driver is depressing the accelerator. Yet such rolling can be hazardous to both the driver and passengers in the vehicle and the vehicle, as well as be dangerous for other individuals and vehicles that may be located downhill from the vehicle.

Accordingly, there remains a need for further contributions in this area of technology.

BRIEF SUMMARY

An aspect of the present application is a park brake system for adjusting a tension in a brake cable that is coupled to a park brake. The park brake system can include a driver that is communicatively coupled to a microcontroller, and an actuator having a thread portion and which is rotatably displaceable by operation of the driver. The park brake system can also include an equalizer assembly having at least one extension and an internal thread, the at least one extension being configured to be coupled to the brake cable and linearly displaceable along the actuator when the actuator is rotatably displaced via a mating engagement between the internal thread and the threaded portion of the actuator. The microcontroller can be configured to monitor a current being drawn by the driver as the driver is operated and generate instructions to cease operation of the driver upon the current reaching a predetermined current threshold that corresponds to a maximum force that is to be applied by the park brake.

Another aspect of the present application is a method that includes rotating, in a first direction by operation of a driver, an actuator and linearly displacing an equalizer assembly in a first direction along a threaded portion of the rotated actuator. The method can also include adjusting, by the linear displacement of the equalizer assembly in the first direction, a tension in a brake cable that is coupled to the equalizer assembly, wherein adjusting the tension in the brake cable adjusts a force being applied by a park brake that is coupled to the brake cable. Additionally, the current drawn by the driver can be monitored as the driver rotates the actuator, and a determination can be made that the current drawn by the driver satisfies a predetermined current threshold that corresponds to a maximum force that is to be applied by the park brake when the park brake is at a set position.

Additionally, an aspect of the present application is a method that includes rotating, by operation of a driver and while a park brake of a vehicle is at a set position, an actuator, and linearly displacing an equalizer assembly along a threaded portion of the rotated actuator. The method can also include decreasing, as the equalizer assembly is linearly displaced, a tension in a brake cable that is coupled to a park brake, the decrease in tension in the brake cable facilitating displacement of the park brake away from the set position. Additionally, output signals from an encoder that is coupled to the driver can be monitored as the driver rotates the actuator, and operation of the driver can cease when the monitored output signals from the encoder satisfy a predetermined threshold, the predetermined threshold corresponding to the park brake being displaced to a running clearance position.

BRIEF DESCRIPTION OF THE DRAWINGS

The description herein makes reference to the accompanying figures wherein like reference numerals refer to like parts throughout the several views.

FIG. 4A illustrates a partial cut away top side view of a representation of an exemplary vehicle having a park brake system according to an illustrated embodiment of the subject application.

FIG. 4B illustrates a side perspective view of a portion of an exemplary vehicle.

FIG. 5 illustrates, for at least purposes of discussion, a simplified representation of a park brake.

Figure 1:
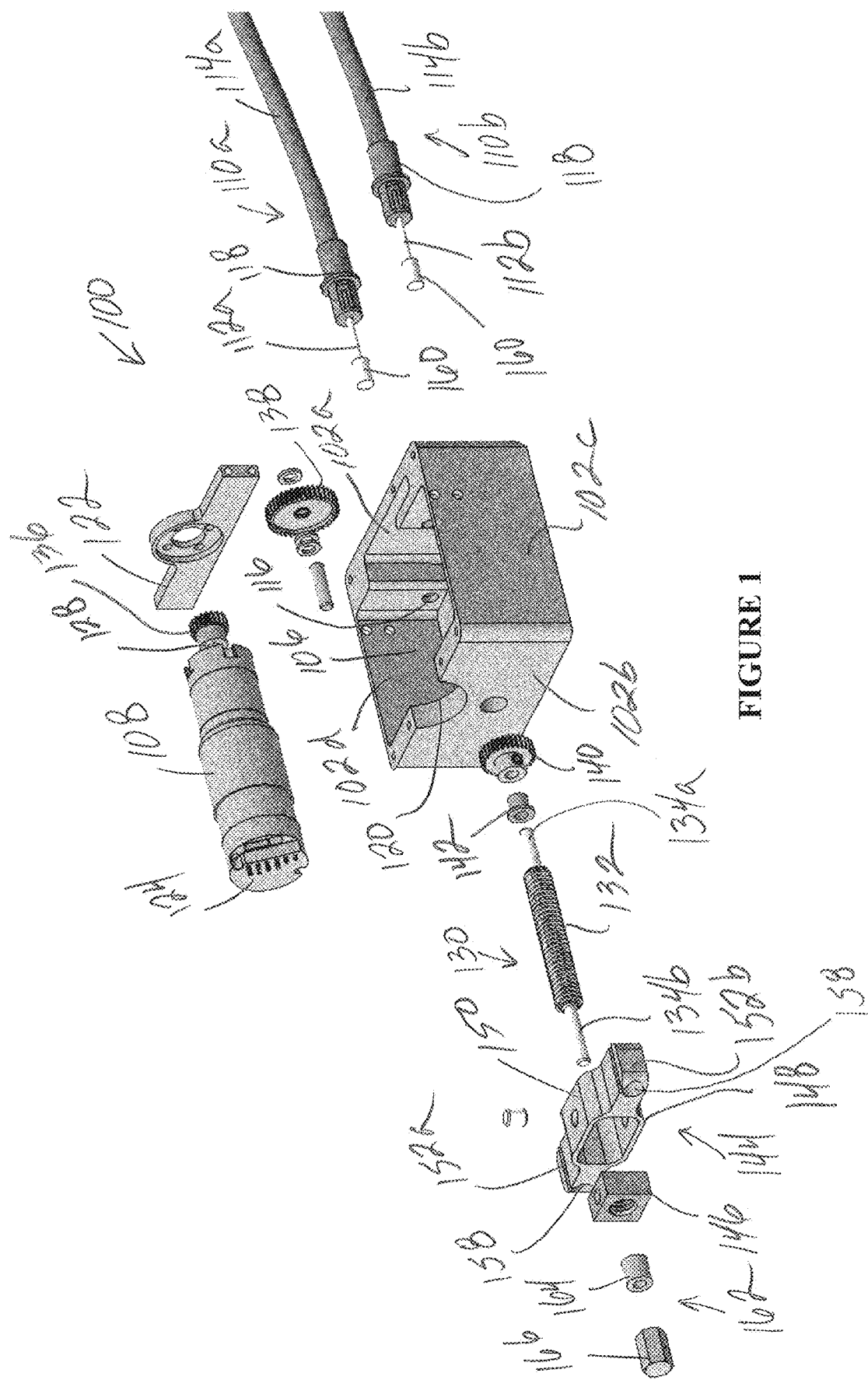
FIG. 1 illustrates an exploded view of an exemplary brake actuation assembly according to an illustrated embodiment of the subject application.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 3:
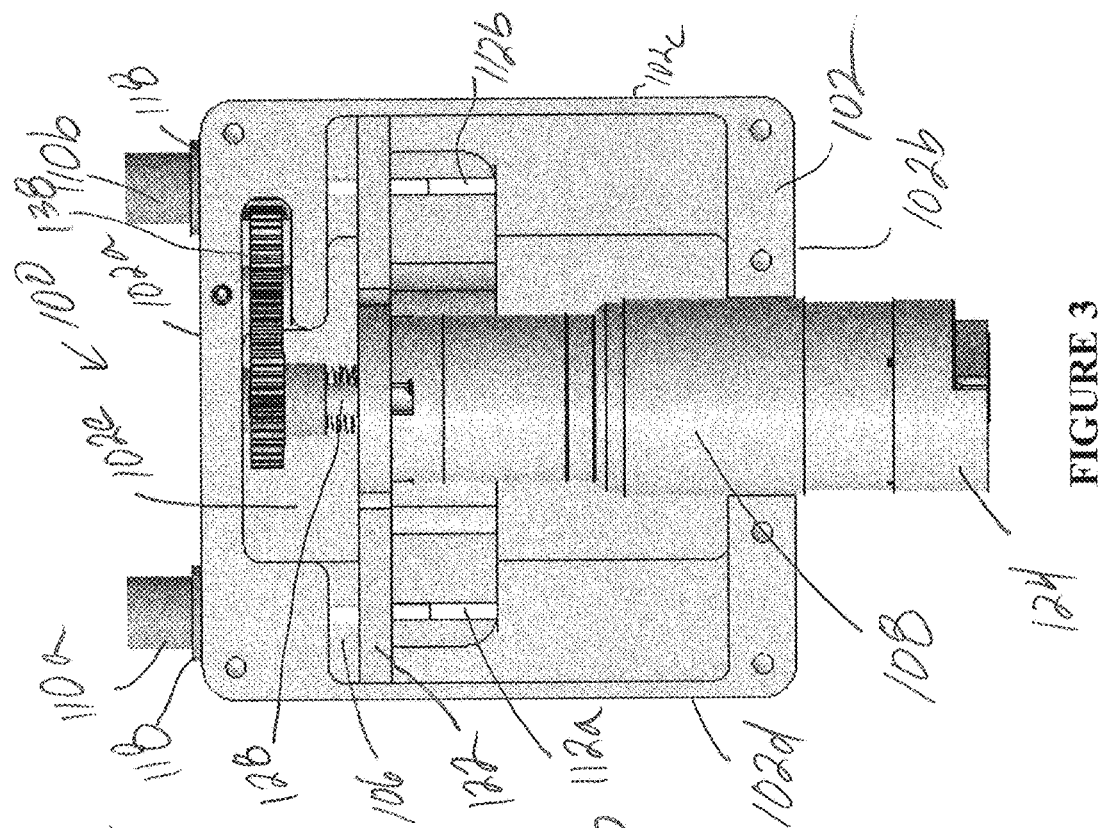
FIGS. 2 and 3 illustrate a top side perspective view and a top view, respectively, of the brake actuation assembly shown in FIG. 1.
Figure 2:
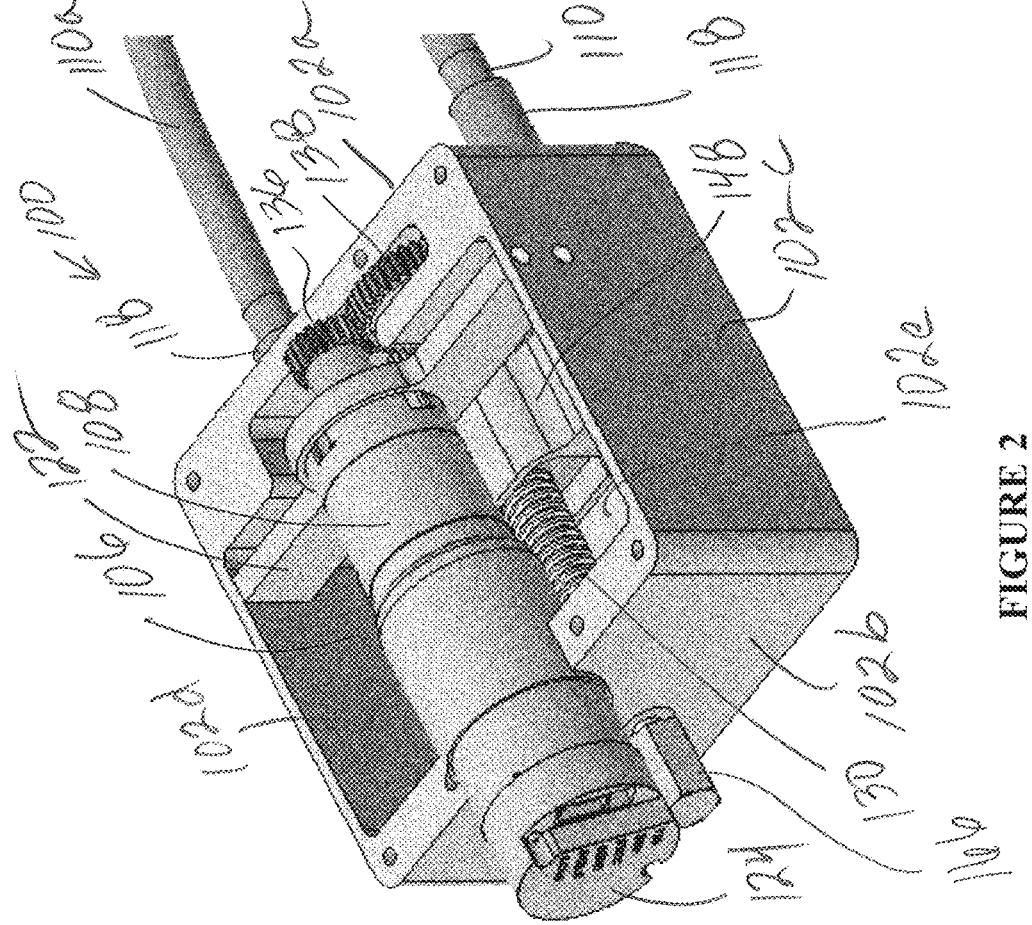

FIGS. 1-3 illustrate a brake actuation assembly 100 of a park brake system 170 (FIG. 4A) according to an illustrated embodiment of the subject application. As shown, the brake actuation assembly 100 can include a housing 102 having a plurality of sidewalls 102a-e that can generally define an interior region 106 of the housing 102. The interior region 106 of the housing 102 can be sized to house at least a portion of a plurality of components of the brake actuation assembly 100, including, for example, at least a portion of a driver 108 and an associated drive assembly.

According to the illustrated embodiment, a first sidewall 102a of the housing 102 can be configured to be coupled to a pair of brake cables 110a, 110b, each brake cable 110a, 110b having a cable 112a, 112b (collectively cable 112) and a cable sheath 114a, 114b. For example, according to the illustrated embodiment, the first sidewall 102a of the housing 102 can include orifices 116 for each brake cable 110a, 110b such that at least a portion of the cable 112a, 112b of the brake cable 110a, 110b can extend into the interior region 106 of the housing 102. Additionally, according to the illustrated embodiment, the brake cable 110a, 110b can include a housing fitting 118 that is sized to extend into a portion of the adjacent orifice 116 of the housing 102 in a manner that can at least assist in securing the brake cable 110a, 110b to the housing 102. For example, according to the illustrated embodiment, the housing fitting 118 can be configured for a snap or press fit with/in the orifice 116 in a manner that can retain the housing fitting 118, and thus the brake cable 110a, 110b, in secured engagement with the first sidewall 102a of the housing 102.

While a variety of different types of drivers can be utilized with the brake actuation assembly 100, according to the illustrated embodiment, the driver 108 is an electric motor. As shown in FIG. 1, at least a portion of the driver 108 can extend through an aperture 120 in a second sidewall 102b of the plurality of sidewalls 102a-e. Additionally, the driver 108 can be coupled to a mount 122 that can be at least partially positioned within the interior region 106 of the housing 102. The mount 122 can be connected to the driver 108 in a variety of manners, as well as secured to the housing 102, such as, for example, via one more mechanical fasteners, including, but not limited to, bolts, nuts, screws, and/or pins, among other fasteners.

Further, according to certain embodiments, the driver 108 can include an encoder 124 that can be communicatively coupled to a microcontroller 126 (FIG. 6) of the park brake system 170. The encoder 124 can be configured to provide, or otherwise detect, information regarding the operation of the driver 108, including, for example, a speed and/or position of an output shaft 128 of the driver 108. The selection and type of encoder 124 utilized with driver 108 can vary, and can be based on a variety of criteria, including, but not limited to, the type of driver 108 and the manner in which the encoder 124 is to be mounted and/or coupled to the driver 108. According to certain embodiments, the encoder 124 can output information relating to the rotational speed and/or position of the output shaft 128 in the form of square-wave pulses.

The brake actuation assembly 100 can also include an actuator 130. According to the illustrated embodiment, the actuator 130 includes a screw or thread portion 132 that extends along at least a portion of an outer circumference of the actuator 130, and which is positioned between opposing first and second shaft ends 134a, 134b of the actuator 130. Additionally, the thread portion 132 of the actuator 130 can extend along a central longitudinal axis of the actuator 130 that is generally the same as the axis about which the actuator 130 rotates during operation of the brake actuation assembly 100.

Torque provided by rotational displacement of the output shaft 128 during operation of the driver 108 can be directly or indirectly transmitted to the actuator 130. For example, according to certain embodiments, the output shaft 128 of the driver 108 can be coupled to a gear set that is operably coupled, or otherwise connected, to the actuator 130. According to the illustrated embodiment, the output shaft 128 includes, or is coupled to, a pinion gear 136 that can matingly engage the teeth of an idler gear 138, with the teeth of the idler gear 138 being matingly engaged with teeth of a driver gear 140. Further, the driver gear 140 can be directly or indirectly connected to the actuator 130, such as, for example, at least a portion of the first shaft end 134a of the actuator 130 being retained within a bore of the drive gear 140 via one or more pins, keys, and/or retaining rings, as well as via a press fit and/or an interference fit, among other manners of connection. Further, as shown in FIG. 1, according to certain embodiments, the drive gear 140 can also include a thrust bushing 142 that is received in the bore of the drive gear 140, and which can therefore receive at least a portion of the first shaft end 134a of the actuator 130.

The brake actuation assembly 100 can also include an equalizer assembly 144 that can be housed within the interior region 106 of the housing 102. The equalizer assembly 144 can include a traveling nut 146 and an equalizer housing 148. The equalizer housing 148 can include a body portion 150 positioned between opposing first and second extensions 152a, 152b of the equalizer assembly 144. The body portion 150 can include a cavity 154 that is sized to receive placement of at least a portion of the traveling nut 146, which can be secured within the cavity 154 in a variety of manners, including, but not limited to, via a mechanical fastener, such as, for example, a bolt, screw, and/or pin 156. Alternatively, according to other embodiments, the traveling nut 146 and the equalizer housing 148 can be part of a unitary, monolithic structure.

The first and second extensions 152a, 152b extend in opposing directions away from the body portion 150, and are each configured to be coupled to a brake cable 110a, 110b. For example, according to the illustrated embodiment, each of the first and second extensions 152a, 152b can include an aperture 158 that matingly engages a cable fitting 160, such as, for example, a cable anchor that is secured to an end of the cable 112a, 112b of the brake cable 110a, 110b. According to such an embodiment, each cable fitting 160 can be secured to one of the first and second extensions 152a, 152b such that the cable fittings 160 are linearly displaced with the linear displacement of the equalizer assembly 144 along the actuator 130, as discussed below. Thus, in the event the equalizer assembly 144 is linearly displaced along the actuator 130 within the interior region 106 of the housing 102 in a direction away from the cable sheath 114a, 114b, such as, for example, toward a second sidewall 102b of the housing 102, such displacement of the cable fittings 160 with the equalizer assembly 144 can result in an increase in a tension in the cables 112a, 112b of the brake cable 110a, 110b, which can increase a pulling force transmitted by each of the cables 112a, 112b. Conversely, in the event the equalizer assembly 144 is linearly displaced along the actuator 130 in an opposite direction, such as, for example, toward the first sidewall 102a of the housing 102, such displacement of the cable fittings 160 with the equalizer assembly 144 can result in a reduction in the tension force of the cables 112a, 112b, and thereby decrease the pulling force transmitted by the cables 112a, 112b.

The configuration of the equalizer assembly 144 and its associated displacement along the thread portion 132 upon selective operation of the driver 108 can prevent the equalizer assembly 144 from inadvertently being back driven in a manner that could loosen the tension placed by the equalizer assembly 144 on the cables 112a, 112b, and thus the pressure or frictional resistance asserted by the park brake 176 when the park brake 176 is at the set position. Accordingly, such a configuration also can maintain a relatively constant tension in the cables 112a, 112b, and thus maintain a relatively consistent pressure or force by the park brake 176 against the corresponding disc or rotor 188 or other related component without the need to constantly provide a degree of voltage to the driver 108.

The traveling nut 146 includes an internal thread or helical groove that is configured to matingly engage the thread portion 132 of the actuator 130. Thus, as the actuator 130 is rotatably displaced, the engagement between the internal threads of the traveling nut 146 and the thread portion 132 of the actuator 130 can result in the traveling nut 146, and thus equalizer assembly 144, being linearly displaced along at least the thread portion 132 of the actuator 130. The direction of such linear displacement of the equalizer assembly 144 can thus be controlled by the direction at which the actuator 130 is rotated, which, for example, can be controlled by direction at which the driver 108 rotates the output shaft 128.

According to certain embodiments, the brake actuation assembly 100 can also include a bushing 164 that can be positioned within an orifice in the second sidewall 102b of the housing 102. More specifically, the bushing 164 can be positioned within an orifice that, prior to receipt of the busing 164, provides an opening in the second sidewall 102b having a size that can accommodate passage of thread portion 132 of the actuator 130 into the interior region 106 of the housing 102. When positioned in the orifice, the bushing 164 can receive passage through, as well as support, portions of second shaft end 134b of the actuator 130.

The brake actuation assembly 100 can also include a release assembly 162 that, when operated, is configured to rotate the actuator 130, and thus facilitate linear displacement of the equalizer assembly 144. Moreover, the release assembly 162 is configured to allow for rotation of the actuator 130, and thus linear displacement of the equalizer assembly 144, at least in the event that the driver 108 is inoperable and/or non-responsive, or that operation of the driver 108 is not resulting in linear displacement of the equalizer assembly 144. According to the illustrated embodiment, the release assembly 162 comprises a drive body 166 that is configured for mating engagement with a tool that can be operated by an operator. Thus, for example, according to the illustrated embodiment, the drive body 166 has an external hexagonal shape that can be matingly engage by a wrench and/or socket, among other forms of tool engagement. According to such an embodiment, with the tool matingly engaged with the drive body 166, torque provided via operation of the tool can be transmitted to the actuator 130 so as to cause rotation of the actuator 130, and thus facilitate linear displacement of the equalizer assembly 144.

FIG. 4A illustrates a partial cut away top side view of a representation of an exemplary vehicle 168 having a park brake system 170 according to an illustrated embodiment of the subject application. A variety of different types of vehicles can be used with the park brake system 170, such as, for example, vehicles that are motorized or otherwise powered via use of electrical power, batteries, internal combustion engines, renewal energy sources, and/or combinations thereof, in addition to other manners of motorization. Further, the vehicle 160 can be adapted for a variety of different types of applications and/or uses, as well as accommodate a different number of passengers. For example, according to certain embodiments, the vehicle 168 is a utility vehicle, including, but not limited to, a golf car or cart. Alternatively, or additionally, according to other embodiments, the vehicle 168 is a fully autonomous vehicle, small all-terrain utility vehicle, a neighborhood vehicle, or any other similarly classed light utility passenger vehicle. Additionally, while the vehicle 168 shown in FIG. 4A has four tires or wheels 172, the park brake system 170 of the subject application can be incorporated into vehicles having a less, or more, than four tires or wheels 172.

The housing 102 of the brake actuation assembly 100 can be mounted at a variety of different locations on the vehicle 168. According to certain embodiments, the housing 102 can be mounted to an undercarriage of the vehicle 168. Further, each brake cable 110a, 110b can extend from a first end 174a of the brake cable 110a, 110b that is coupled to the brake actuation assembly 100, as previously discussed, to a second end 174b of the brake cable 110a, 110b that is operably coupled to a park brake 176a, 176b. While FIG. 4A depicts the park brakes 110a, 110b being positioned at the rear tires or wheels 172, the park brakes 176a, 176b can be positioned at other tires or wheels 172, and thus the brake cables 110a, 110b can extend to other tires or wheels 172 of the vehicle 168.

The second end 174b of the brake cables 110a, 110b can be coupled to a variety of different types of park brakes 176a, 176b (collectively referred to as park brake 176), including, for example, drum and disc park brakes. For at least purposes of discussion, FIG. 5 illustrates a general representation of certain aspects of an exemplary park brake 176. As seen, the illustrated example, the park brake 176 can be configured for a disc brake and can thus include, for example, a caliper lever 178 having a first end 180a and a second end 180b. The first end 180a of the caliper lever 178 is securely coupled to the cable 112, while the second end 180b of caliper lever 178 is pivotally coupled to a first brake body 182a that comprises a backing plate 184a and a brake pad 186a. Additionally, the first brake body 182a can be coupled to a second brake body 182b, such as, for example, via brake strut 184. Further, similar to the first brake body 182a, the second brake body 182b can also comprise a backing plate 184b and a brake pad 186b, with the brake bodies 182a, 182b each being position adjacent to opposing sides of a disc or rotor 188 of the wheel assembly, among other components of the tire or wheel 172.

According to such an embodiment, when the park brake 176 is to be set so as to prevent rolling or rotational displacement of the associated tire or wheel 172 of vehicle 168, the cable 112 is pulled. For example, the cable 112 can be pulled by the equalizer assembly 144 being linerally displaced toward the second sidewall 102b of the housing 102 such that the tension force of the cable 112 is increased to a level that is sufficient to pivotally displace the caliper lever 178, as well as overcome biasing forces that may have previously at least resisted or prevented such rotation of the caliper lever 178. Such displacement of the caliper lever 178 can result in transmission of forces that facilitate displacement of the first brake body 182a. According to the illustrated example, such displacement of the first brake body 182a can generally be in an inward direction toward an adjacent surface of the disc or rotor 188, among other components of the tire or wheel 172 of the vehicle 168. Additionally, at least a portion of the force associated with displacement of the caliper lever 178 and/or the first brake body 182a can also be transmitted to the second brake body 182b, such as, for example, via the brake strut 184. Accordingly, as the equalizer assembly 144 is linerally displaced along the actuator 130, and the tension exerted on the brake cable 110a, 110b is increased, the second brake body 182b also is similarly generally inwardly displaced toward an adjacent surface of the disc or rotor 188. Moreover, such displacement can result in the first and second brake bodies 182a, 182b being displaced from a position at which the first and second brake bodies 182a, 182b were separated from the adjacent surfaces of the disc or rotor 188 by a clearance distanced, as shown for example in FIG. 5, to a position at which the first and second brake bodies 182a, 182b, and more specifically the brake pads 186a, 186b, are each pressed against adjacent surfaces of the disc or rotor 188, or other similar components. By pressing against the adjacent surfaces of the disc or rotor 188, among other components of the tire or wheel 172, the first and second brake bodies 182a, 182b can at least provide frictional resistance that resists rotational displacement of the disc or rotor 188. Further, the degree of this frictional resistance between the first and second brake bodies 182a, 182b and the adjacent surfaces of the disc or rotor 188 can, at least to extent, be further increased by a further increase in the tension on the cable 112.

When the park brake 176 is to be released, the actuator 130 can be rotated in a opposite direction that is opposite of the direction the actuator 130 had been rotated when the park brake 112 was begin set. Accordingly, the equalizer assembly 144 is linearly displaced in a direction that is opposite of that which the equalizer assembly 144 traveled when the park brake was being set 112, such as, for example, in a direction that is generally toward the first sidewall 102a of the housing 102. Such displacement of the equalizer assembly 144 can reduce the tension in the cables 112a, 112b, thereby reducing the forces being exerted against the caliper lever 178 and the first and second brake bodies 182a, 182b. Upon the pulling force that is transmitted through the cable 112 being reduced to certain level, biasing elements of the park brake 176 can return the first and second brake bodies 182a, 182b to positions at which the first and second brake bodies 182a, 182b are separated from, and disengaged from contact with, the adjacent surfaces of the disc or rotor 188, or other related components. Further, the first and second brake bodies 182a, 182b can be set to be separated, or apart, from the adjacent surfaces of the park brake 176 by a running clearance positon so as to prevent brake drag.

While the foregoing is discussed in terms of an exemplary park brake 176 for a disc brake, the brake actuation assembly 100 of the subject application can be used with a variety of other types, and configurations, of park brakes, as previously mentioned. For example, according to other embodiments, the second end 174b of the brake cables 110a, 110b can be coupled to a park brake in the form of a drum brake assembly. According to such an embodiment, an increase in tension in the cables 112a, 112b can result in the first and second brake bodies 182a, 182b, which can be brake shoes, being displaced into contact against an inside surface of a brake drum. Similar to the drum brake assembly, when the park brake is being set, the degree of force or pressure exerted by the first and second brake bodies 182a, 182b of the drum brake assembly can increase as the linear displacement of the equalizer assembly 144 increases the tension in the cables 112a, 112b. Further, when the park brake is to be released, upon the pulling force that is transmitted through the cables 112a, 112b being reduced to certain level, biasing elements of the drum brake assembly can return the first and second brake bodies 182a, 182b to positions at which the first and second brake bodies 182a, 182b are generally separated from, and disengaged from contact with, the inner surface of the brake drum.

Figure 6:
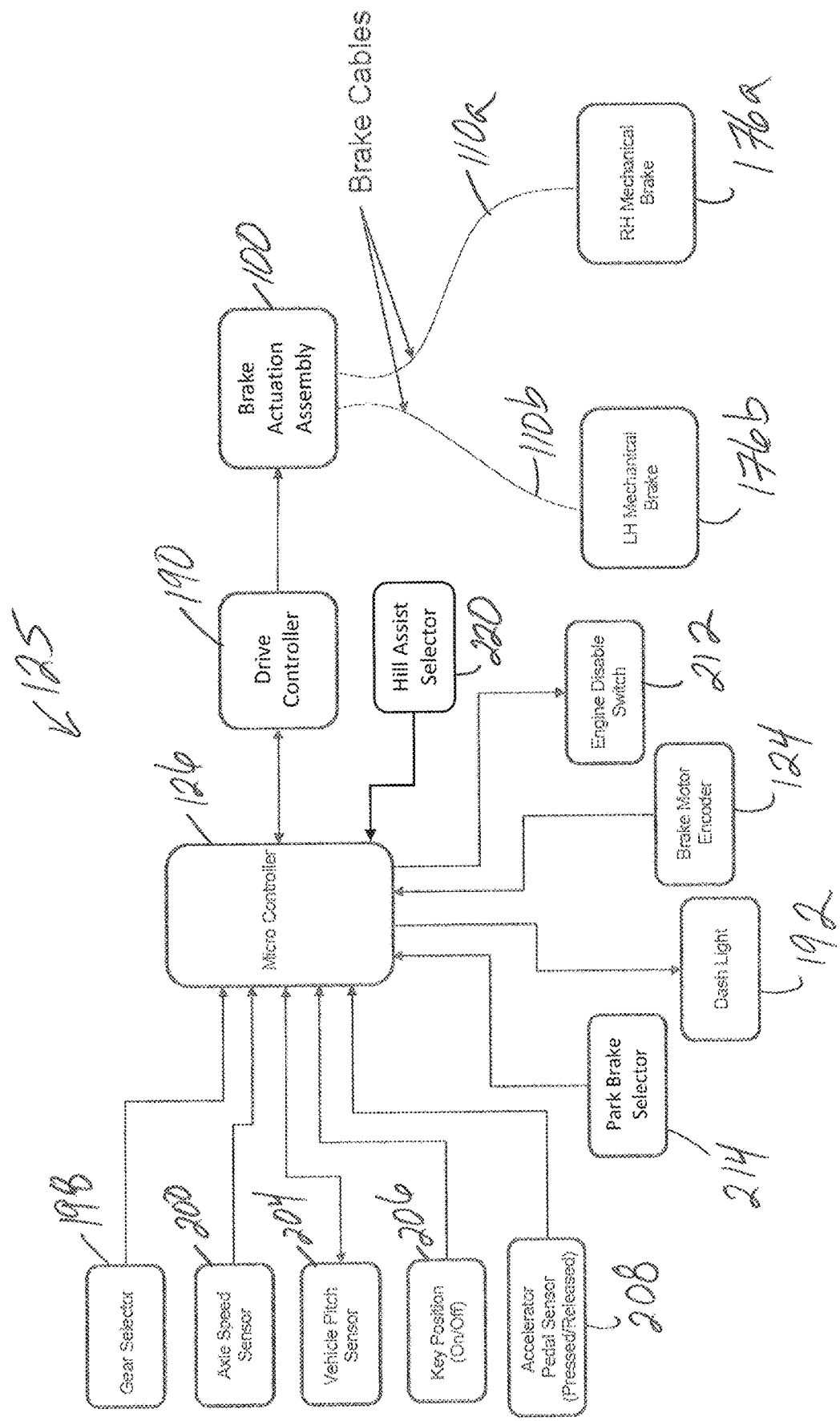
FIG. 6 illustrates a block diagram representation of a park brake system according to an illustrated embodiment of the subject application.

FIG. 6 illustrates a block diagram representation of a park brake system 170 according to an illustrated embodiment of the subject application. According to certain embodiments, the park brake system 170 can include the brake actuation assembly 100, one or more brake cables 110a, 110b, and a control system 125 that includes at least the microcontroller 126 and a drive controller 190. The driver controller 190 and the microcontroller 126 can each be, or include, one or more processing devices, such as, for example, programmable, dedicated, and/or hardwired state machines, or any combination thereof. Additionally, as shown in FIG. 6, the driver controller 190 and the microcontroller 126 can be communicatively coupled to each other, as well as to a variety of components of the park brake system 170 and/or the vehicle 168. The driver controller 190, which can be a motor controller, and the microcontroller 126 can each include multiple processors, such as, for example, Arithmetic-Logic Units (ALUs), Central Processing Units (CPUs), Digital Signal Processors (DSPs), or the like. Further, such multiple processors can also utilize distributed, pipelined, and/or parallel processing. The driver controller 190 and the microcontroller 126 can also be dedicated to performance of just the operations described herein, or may be utilized in one or more additional applications.

In the depicted form, the driver controller 190 and the microcontroller 126 each are of a programmable variety that executes algorithms and processes data in accordance with operating logic as defined by programming instructions (such as software or firmware) stored in a memory of the park brake system 170. Alternatively or additionally, the operating logic is at least partially defined by hardwired logic or other hardware. The processing device can include one or more components of any type suitable to process the signals received from, for example, a variety of different types of input devices and/or sensors, among other devices, and to provide desired output signals, such as, for example, signals to the brake actuation assembly 100 that can facilitate operation of the driver 108, and thus displacement of the equalizer assembly 144 about the thread portion 132 in a manner that can adjust a tension force in the brake cables 110a, 110b, as previously discussed. Additionally, the processing device can also provide a variety of other output signals, including, for example, output signals associated with the operation of other components of the park brake system 170 and/or vehicle 168, including, but not limited to, a dash light 192 and/or an electric monitor or display, among signals for other aspects of the park brake system 170 or vehicle 168 operation. Such components can also include digital circuitry, analog circuitry, or a combination of both.

The memory of the park brake system 170 can comprise memory that is part of, or coupled to, the driver controller 190, as well as a memory that is part of, or coupled to, the microcontroller 126. Further, the memory(ies) can be of one or more types, such as a solid-state variety, electromagnetic variety, optical variety, or a combination thereof. Additionally, the memory(ies) can be volatile, nonvolatile, or a combination thereof, and some or all of the memory(ies) can be of a portable variety, such as a disk, tape, memory stick, cartridge, or the like. In addition, according to certain embodiments, the memory(ies) can store data that is manipulated by the operating logic of the driver controller 190 and the microcontroller 126, respectively, in addition to, or in lieu of, storing programming instructions defining the operating logic.

According to certain embodiments, the driver controller 190 and the microcontroller 126, as well as other components of the park brake system 170, can be attached to one or more electronic boards that can be positioned within a portion of the vehicle 168, including for example, but not limited to, a controller housing 102 (FIG. 4A) that is secured to a portion of the vehicle 168. Additionally, components of the park brake system 170 can receive electrical power from a power supply 194 of the vehicle 168, which may, according to certain types of vehicles, may be the same power supply 194 (FIG. 4A) that provides electrical power for operation of an engine 196 (FIG. 4A) of the vehicle 168 that generates power or torque that is used to drive the vehicle 168.

According to certain embodiments, the microcontroller 126 can be configured to generally monitor and/or control the overall operation, status, and/or condition of the vehicle 168. For example, as shown in FIG. 6, the microcontroller 126 can receive information from a gear selector sensor 198 that provides an indication of whether a user operated gear selection device is in a forward, reverse, or neutral position, which can correspond to whether the transmission and associated gearing is set for the vehicle 168 to be driven in a forward or reverse direction, or whether the transmission is currently in a neutral gear. Further, according to certain embodiments, the gear selector sensor 198 can comprise two mechanical switches that can provide an indication of whether the gear selection device is, or is not, in a position associated with forward driving or reverse driving of the vehicle 168.

The microcontroller 126 can also receive information from a variety other output devices, including for example, an axle speed sensor 200, which can, for example, detect movement and/or speed of the axle 202 (FIG. 4A) or components associated with movement of the axle 202, including, for example, movement of gears in the axle 202. For example, according to certain embodiments, the axle speed sensor 200 may include an embedded magnet and integrated circuit sensor that can detect variations in flux associated with teeth of one or more gears in the axle 202 passing by the IC sensor as the axle 202 moves, and/or the lack of such variations in flux associated with non-movement of the vehicle 168. The microcontroller 126 can also receive information from a vehicle pitch sensor 204, such as, for example, an accelerometer or gyro that can provide information indicative of the orientation or positioning of the vehicle 168, including, but not limited to, the pitch of the vehicle 168 along an incline or decline. Such information can be used to determine whether the vehicle 168 is oriented in an uphill direction, such as, for example, the front end of the vehicle 168 is uphill of the rear end of the vehicle such that the vehicle 168 will travel up an incline when the vehicle is in a forward driving gear, and conversely, travel downhill when in a reverse driving gear. Similarly, such pitch information can provide an indication as to whether the vehicle 168 is in a downhill orientation such the rear end of the vehicle 168 is uphill of the front end of the vehicle 168, in which case the vehicle 168 would travel downhill when in the forward driving gear.

Additionally, the microcontroller 126 can also include a key position sensor 206 and an accelerator position sensor 208, which can provide information indicating a position of an ignition key and the accelerator 210 (FIG. 4B) of the vehicle 168, respectively. For example the key position sensor 206 can provide information as to whether the ignition key and/or the associated ignition key cylinder into which the ignition key is inserted, is/are at the on or off position. Further, the accelerator position sensor 208 can provide information indicating whether the accelerator 210 of the vehicle 168 is, or is not, depressed, such as, for example, by a foot of the driver, to a down position and/or released or disengaged by the driver, and thus in an up position. Further, if the accelerator 210 is pressed, the accelerator position sensor 208 can provide an indication of the degree or extent to which the accelerator 210 is pressed, which can correspond to, for example, the degree of power the driver is seeking to have outputted from operation of the engine 196. The microcontroller 126 can also be communicatively coupled to an engine disable switch 212 that can be used to break the electrical connection to the ignition system and/or between the battery and engine 196. The engine disable switch 212 can be utilized by the microcontroller 126 in at least an attempt to prevent a user from being able to drive the vehicle 168. For example, according to certain embodiments, the microcontroller 126 can be configured to utilize the functionality of the engine disable switch 212 to disable operation of the engine 196 when the park brake system 170 is engaged According to the illustrated embodiment, the microcontroller 126 generally controls operation of the park brake system 170, including, for example, when the park brake 176 is either to be set or released, by using the operating logic of the microcontroller 126 and information provided by various sensors. Thus, the microcontroller 126 can be coupled to a variety of components that can provide information regarding a current status or condition of the park brake system 170. For example, the microcontroller 126 can be communicatively coupled to a user operated park brake selector 214, such as, for example, a dash button 214. The park brake selector 214 can take a variety of different forms, such as, for example, a button, switch, or other user operated or selected input device. Further, according to certain embodiments, the park brake selector 214 can be position on a dash 216 (FIG. 4B) of the vehicle 168, or a park brake pedal 218 (FIG. 4B). Operation of the park brake selector 214 by the driver can provide an indication of whether the driver has selected to set, or release, the park brake 176. However, as discussed below, according to certain embodiments and/or in certain situations, operation of the park brake system 170, and thus the setting or release of the park brake 176, can be autonomous, and thus may not directly involve user activation of the park brake system 170.

The microcontroller 126 can also be communicatively coupled to a park brake dash light 192 that can be mounted on the vehicle 168 at a location that is visible to a driver of the vehicle 168, including, for example, on the dash 216 of the vehicle 168. According to such embodiments, the park brake dash light 192 can be illuminated via a signal that is generated by the microcontroller 126, such as, for example, illuminated in a manner that notifies that driver of the vehicle 168 that the park brake system 170 is activated and/or fully engaged. Further, such illumination of the dash light 192 can, in addition to providing a visual indication that the park brake 176 is set, can also indicate that the engine 196 is currently disabled, such as, for example disabled by the microcontroller 126 utilizing the engine disable switch 212.

Additionally, the microcontroller 126 can also be communicatively coupled to a hill assist selector 220, such as, for example, a button, switch, or other user operated or selected input device. Thus, according to certain embodiments, enabling the hill assist feature by the user may involve the user setting the hill assist selector 220 to an "On" position. Further, as discussed below, the hill assist selector 220 can be used in connection with the user seeking automated operation of the park brake system 170, including, for example, automated operation of the park brake system 170 in a manner that may prevent, in at least certain situations, unintended rolling of the vehicle 168. For example, according to certain embodiments, by enabling automated operation of the park brake system 170, the microcontroller 126 can operate the park brake system 170 in a manner that may at least hold the position of the vehicle 168. Such a hold in the position of the vehicle 168 by operation of the hill assist feature can, in at least certain situations, prevent movement, including downward rolling, of the vehicle 168 that may otherwise occur following the driver releasing the service brake and prior to the engine 196 generating torque that is sufficient to prevent such movement or rolling.

The microcontroller 126 can also be communicatively coupled to the encoder 124 such that the microcontroller 126 receives information detected by the encoder 124 regarding the operation, status, and/or position of the driver 108. For example, as previously discussed, the encoder 124 can be configured to provide, or otherwise detect, information regarding the operation of the driver 108, including, for example, the speed and/or position of the output shaft 128 of the driver 108, which can be provided to the microcontroller 126. Such information can, among other information, provide an indication of a status of the park brake 176, such as, for example, whether the park brake is, or is not, at the set position.

The degree of force that is to be exerted by the park brake 176 via operation of the brake actuation assembly 100 can be determined in a variety of manners. For example, when the vehicle 168 is stopped, the friction between the tire or wheel 172 of the vehicle 168 and the ground can generate a torque that attempts to rotate the tire. This generated torque can be estimated using the weight distribution of the vehicle 168, the size of the tires of the vehicle 168, and the current angle or pitch at which the vehicle 168 is positioned on the ground or other surface. According to certain embodiments, the microcontroller 126 can utilize the maximum allowed or recommended weight of the vehicle 168, a fixed size for each tire, a real-time angle data, such as, for example, an angle based at least in part on information provided by the vehicle pitch sensor 204, and a torque/force curve for the park brake 176 to determine a force that is to be applied by the park brake 176 to hold the position of the vehicle 168. Further, for embodiments in which the driver 108 is an electric motor, using at least this determined force, the microcontroller 126 can determine or estimate the torque needed to turn the actuator 130, which can then be used in conjunction with a torque/speed curve and a stall/no load current for the electric motor. From this determined torque information for the driver 108, the current drawn by the driver 108 can be directly correlated to the force that is to be applied to the park brake 176.

Thus, according to the illustrated embodiment, the driver controller 190 can provide to the microcontroller 126 information indicating the real-time current that is being used by the driver 108. The microcontroller 126 can monitor this real-time current and continue to command the driver controller 190 to operate, and thus continue to drive the movement of the actuator 130 and associated displacement of the equalizer assembly 144, until driver controller 190 provides real-time current information that indicates that the current limit corresponding to the determined maximum force that is to be applied by the park brake 176 is reached. By continued to operate the driver 108 at least until the real-time current being drawn by the driver 108 has reached a level that corresponds to the determined maximum force that is to be applied to the park brake 176 is reached, the park brake system 170 can prevent instances in which the park brake 176 is only partially set, or more specifically, instances of light brake setting. Additionally, by continuing to operate the driver 108 at least until the park brake 176 is applying a pressure or force to hold the position that corresponds to the determined maximum force, the park brake system 170 can generally be consistent in terms of the force the park brake 176 applies to hold the position of the vehicle 168, regardless of the degree of stretching that may have occurred in the cables 12a, 12b, and/or the degree of wear in the brake pads 186a, 186b.

When the park brake 176 is to be released, the microcontroller 126 can count the pulses being outputted by the encoder 124 as the output shaft 128 of the driver 108 is operated in a manner that rotates the actuator 130, and thus displaces the equalizer assembly 144, in a direction that decreases the tension in the brake cables 110a, 110b. When the microcontroller 126 determines that the number of pulses counted by the microcontroller 126 reaches a predetermined threshold, the microcontroller 126 can determine that that the park brake 176 has been displaced to attain a running clearance between the park brake 176 and the disc or rotor 188, and moreover, displaced to a position at which the park brake 176 will not interfere with rotation of the tire or wheel 172 of the vehicle 168. The microcontroller 126 can then generate a signal to the driver controller 190 to stop operation of the driver 108. Such a control method allows for the park brake system 170 to self-adjust the park brake 176. Moreover, such a method allows the park brake system 170 to account for both brake wear of the park brake 176, such as, for example, brake pad 186a, 186b or brake shoe wear, as well as cable stretch of the cables 112a, 112b of the brake cables 110a, 110b while also maintaining the same set/release time throughout the life of the park brake 176.

Additionally, when the park brake 176 is to be released while the vehicle 168 is positioned on, and oriented to travel up, an incline, the microcontroller 126 can delay the release of the park brake 176 until the power generated by operation of the engine 196 of the vehicle 168 provides sufficient torque at the axle 202 to prevent the vehicle 168 from rolling down the incline. The microcontroller 126 can determine the existence of sufficient torque at the axle 202 in a variety of manners, including, for example, by sensing movement in the axle 202, such as via the axle speed sensor 200, which can indicate when the torque at the axle 202 has exceeded the torque required to hold the vehicle 168 in place along the include. Additionally, or alternatively, the microcontroller 126 can determine the presence of sufficient torque at the axle 202 using a torque sensor that can be position on a variety of different rotating components of the axle 202 and/or engine 196. Further, according to certain embodiments, the presence of sufficient torque at the axle 202 can be determined by the microcontroller 126 calculating the theoretical torque at the axle 202 using a detection information that indicates the revolutions per minute (RPM) of the engine 196 and the gear ratio between the engine 196 and the axle 202.

Figure 7:
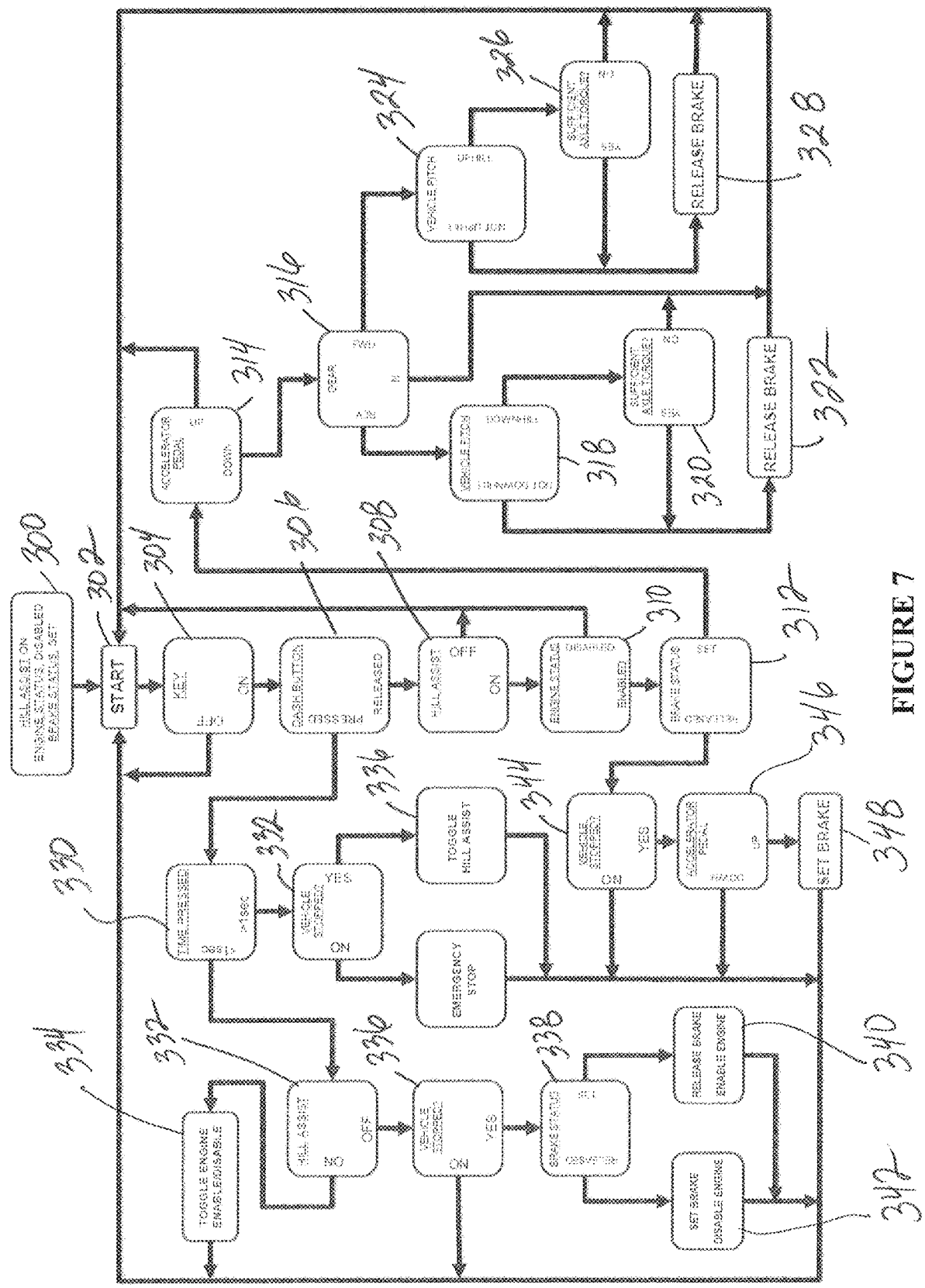
FIG. 7 illustrates an exemplary flow chart depicting control logic for a park brake system according to an illustrated embodiment of the subject application.

FIG. 7 illustrates an exemplary flow chart depicting control logic for a park brake system 170 according to an illustrated embodiment of the subject application. As shown, in the illustrated example, the logic flow chart starts with a condition at step 300 in which automated operation of the park brake system 170 by the microcontroller 126 is enabled, as indicated by the feature "HILL ASSIST: ON", the engine 196 has been disabled by the microcontroller 126, and the park brake 176 is at the set position so as to prevent movement of the vehicle 168. Upon starting at step 302, the microcontroller 126 can determine at step 304 the key position, such as, for example, via information provided to the microcontroller 126 by the key position sensor 206 and/or by the ignition system of the vehicle 168. If at step 304 the microcontroller 126 determines the key is in the off position, such as, for example, the key is not in the lock cylinder and/or the lock cylinder has not been rotated to an "On" position, the process can be completed. If however the microcontroller 126 determines the key is in the "On" position, the microcontroller 126 can then determine at step 306 whether, via user engagement with the park brake selector 214, the user is pressing the park brake selector 214 so as to utilize the park brake 176, or if the user is seeking to release the park brake 176.

If the microcontroller 126 determines at step 306 that the user is releasing the park brake 176, then at step 308 the microcontroller 126 can determine whether the automated operation of the park brake system 170, and moreover the hill assist feature, is on or enabled. As previously mentioned, according to certain embodiments, such a hill assist feature can allow the microcontroller 126 to automatically generate signals that can result in the automatic setting, release, and/or adjustment of the park brake 176. If hill assist feature is not enabled, also referred to as off or disabled, then the current process can come to completion, as indicated by the return to "START" in FIG. 7. If however the microcontroller 126 determines at step 308 that hill assist feature is enabled, then at step 310 the microcontroller 126 can determine whether the engine 196 status is still disabled, or whether the engine 196 is enabled. If the microcontroller 126 determines the engine 196 is disabled, then the current process can come to completion, as indicated by the return to "START" in FIG. 7.

If the microcontroller 126 determines at step 310 that the engine 196 is enabled such that the vehicle 168 can be operated or driven by the driver, then at step 312, with the hill assist feature on, the microcontroller 126 can determine the status of the park brake 176. If the microcontroller 126 determines at step 312 that the park brake 176 is set, such that park brake 176 is engaged in manner that at least attempts to hold a position of the vehicle 168, then at step 314 the microcontroller 126 can determine whether the accelerator 210 is in a down position. As previously discussed, the position of the accelerator 210 can be determined in a number of manners, including, for example, via use of the accelerator position sensor 208, and can indicate whether the accelerator 210 is currently being depressed by the driver, or in an up position, such as, for example, not being engaged by the user. If at step 314 the microcontroller 126 determines that the accelerator 210 is in the up position, then the current process can come to completion. If however at step 314 the microcontroller 126 determines that the accelerator 210 is in the down position, then at step 316 the microcontroller 126 can determine whether the vehicle 168 is in gear for going in the forward or reverse directions, or in a neutral gear such that torque provided via operation of the engine 196 is not being used to drive the vehicle 168 in either the forward or reverse directions. Determination by the microcontroller 126 of whether the vehicle 168 is in gear for forward or reverse driving, or in neutral, can be based, at least in part, on information provided by the gear selector sensor 198, as previously discussed. Further, if at step 316 the microcontroller 126 determines that the vehicle 168 is in the neutral gear, then the process can begin again, including, for example, returning to step 302.

If at step 316, a determination is made that the vehicle 168 is in gear for rearward or reverse travel, then at step 318 a determination is made as to whether the pitch of the vehicle 168 is, relative to the incline on which the vehicle 168 is positioned, in a downhill direction. Such a determination of the pitch of the vehicle 168 can be based on a variety of information, including, for example, information provided by the vehicle pitch sensor 204. If at step 318 the microcontroller 126 determines that the vehicle 168 is in a downhill orientation, then at step 320 the microcontroller 126 can determine whether the engine 196 of the vehicle 168 has yet generated sufficient torque to prevent downward rolling of the vehicle 168. As previously discussed, the presence of sufficient torque at the axle 202 can be determined in a variety of different manners, including, for example, using information relating to sensed movement of the axle 202, one or more torque sensors, and/or calculating a theoretical torque at the axle 202. If there is insufficient torque at the axle 202 to prevent rearward rolling, then the park brake 176 may not be released, and the process can begin again, including, for example, returning to step 302.

If however the microcontroller 126 determines at step 320 that there is sufficient torque at the axle 202 to prevent rearward rolling of the vehicle 168, then at step 322 the microcontroller 126 can proceed with releasing the park brake 176. According to certain embodiments, when the microcontroller 126 has determined to release the park brake 176, the microcontroller 126 can generate a signal that commands the driver controller 190 to enable operation of the driver 108 such that the output shaft 128 is rotated in a direction, such as, for example, a reverse direction, that reduces the tension in the cables 112a, 112b, of the brake cables 110a, 110b. As the driver 108 is operated in reverse, the microcontroller 126 can count the pulses outputted from the encoder 124, and determine when the number of counted pulses reaches a predetermined threshold number of pulses that may be associated with the park brake 176 being displaced to a position at which the park brake 176 reaches a running clearance position at which the park brake 176 is disengaged and separated from the disc or rotor 188, or other object, such that the park brake 176 is not providing frictional resistance against the rotation of the tire or wheel 172 and/or at a disengagement or release location that prevents brake drag. Upon the microcontroller 126 determining the park brake 176 has reached the running clearance position, the microcontroller 126 can generate a signal for the driver controller 190 to end operation of the driver 108 in the reverse direction. Further, with the park brake 176 released, the driver of the vehicle 168 can proceed with driving the vehicle 168.

Returning to step 318, if the determination at step 318 is that the pitch of the vehicle 168 is indicative of the vehicle 168 not being oriented in a downhill direction, then the process can proceed to step 322, and the microcontroller 126 can then proceed with releasing the park brake 176, as previously discussed. With the park brake 176 released, the driver of the vehicle 168 can proceed with driving the vehicle 168.

If the determination at step 316 is that the vehicle 168 is in a forward gear, then at step 324 a determination is made as to whether the pitch of the vehicle 168 is, relative to the incline on which the vehicle 168 is positioned, in an uphill direction. Similar to step 318, such a determination of the pitch of the vehicle 168 at step 324 can be based on a variety of information, including, for example, information provided by the vehicle pitch sensor 204. If at step 324 the microcontroller 126 determines that the vehicle 168 is in an uphill orientation, then at step 326 the microcontroller 126 can determine whether the engine 196 of the vehicle 168 has yet generated sufficient torque to prevent downward rolling of the vehicle 168. Again, as previously discussed, the presence of sufficient torque at the axle 202 can be determined in a variety of different manners, including, for example, using information relating to sensed movement of the axle 202, one or more torque sensors, and/or calculating a theoretical torque at the axle 202. If there is insufficient torque at the axle 202 to prevent rearward rolling, then the park brake 176 may not be released, and the process can begin again, including, for example, returning to step 302.

If however the microcontroller 126 determines at step 326 that there is sufficient torque at the axle 202 to prevent rearward rolling, then at step 328 the microcontroller 126 can proceed with releasing the park brake 176. Similar to step 322, at step 328 when the microcontroller 126 has made a determination to release the park brake 176, the microcontroller 126 can generate a signal that commands the driver controller 190 to enable operation of the driver 108 such that the output shaft 128 is rotated in a direction, such as, for example, a reverse direction, that reduces the tension in the cables 112a, 112b, of the brake cables 110a, 110b. As the driver 108 is operated in reverse, the microcontroller 126 can count the pulses outputted from the encoder 124 to determine when the number of counted pulses reaches the predetermined threshold number of pulses associated with the displacement of the park brake 176 reaching the running clearance position. Upon the microcontroller 126 determining the park brake 176 has reached the running clearance position, the microcontroller 126 can generate a signal for the driver controller 190 to end operation of the driver 108 in the reverse direction. Further, with the park brake 176 released, the driver of the vehicle 168 can proceed with driving the vehicle 168.

Returning to step 324, if the determination at step 324 is that the pitch of the vehicle 168 is, relative to the incline on which the vehicle 168 is positioned, indicative of the vehicle 168 not being at oriented in an uphill direction, then the process can proceed to step 328, and the microcontroller 126 can then proceed with releasing the park brake 176, as previously discussed. With the park brake 176 released, the driver of the vehicle 168 can proceed with driving the vehicle 168.

Returning to step 306, if the microcontroller 126 determines at step 306 that the user has pressed the park brake selector 214, then at step 330, the microcontroller 126 can determine whether the duration of time that the user pressed the park brake selector 214 satisfies a predetermined time threshold, such as, for example, one second. The duration of time that the park brake selector 214 was pressed can be determined in a variety of manners, including, for example, the duration of time that the microcontroller 126 received a signal from the park brake selector 214, which can correspond to the duration of time the user was actually pressing the park brake selector 214. If the microcontroller 126 determines that the duration of time that the park brake selector 214 was pressed is below the predetermined time threshold, then at step 332 the microcontroller 126 can determine whether the vehicle 168 is, or is not, stopped, or alternatively, if the vehicle 168 is moving. The determination at step 332 can be based on a variety of information, including, but not limited to, information provided by the axle speed sensor 200.

If at step 332 a determination is made that the vehicle 168 is not stopped, and/or that the vehicle 168 is moving, then at step 334 the microcontroller 126 can proceed with activating the park brake system 170 in connection with an emergency stop in the movement of the vehicle 168. Such a feature of the park brake system 170 can provide the driver with an alternate method of stopping the vehicle 168, including, for example, in the event of a loss of service or failure of the service brake system. Thus, according to certain embodiments, at step 334, the microcontroller 126 can generate a signal that commands the driver controller 190 to operate the driver 108 at a reduced speed so as to activate the actuator 130, and thus facilitates displacement of the equalizer assembly 144, in a manner that increases tension in the cables 112a, 112b of the cable brakes 112a, 112b so that the park brake 176 provides frictional resistance against the rotation of the corresponding tire or wheel. The microcontroller 126 may further command the driver controller 190 to provide the microcontroller 126 with an indication or measurement of the real-time current being drawn by the driver 108 as the driver 108 is being operated at the reduced speed. As the current drawn by the motor may increase as the tension being created in the cables 112a, 112b increases via the associated displacement of the equalizer assembly 144 along the rotating actuator 130, the real-time current level being drawn by the driver 108 can be correlated to the degree of frictional resistance being provided by the park brake 176 against rotation of the associated component of the tire or wheel 172. Thus, for example, according to certain embodiments, the microcontroller 126 can compare the real-time current level provided by the driver controller 190 against a predetermined threshold current level. Upon the real-time current level meeting or exceeding the predetermined threshold current level, the microcontroller 126 can determine that the park brake 176 is at the set position. The microcontroller 126 can then instruct the driver controller 190 to cease operation of the driver 108, and thus stop rotation of the actuator 130 and the corresponding displacement of the equalizer assembly 144 along the actuator 130. The microcontroller 126 can then illuminate the dash light 192 so as to indicate that the park brake 176 is set, as well as disable the engine 196 so as to at least temporarily prevent driving of the vehicle 168.

If however at step 332 the microcontroller 126 determines that the vehicle 168 was stopped, then at step 336 the microcontroller 126 can toggle the hill assist feature from an on, or enabled, condition to an off position, or disabled condition or status. With the hill assist feature disabled, the park brake 176 will be released from the set position upon the user depressing the accelerator 210 such that the user can proceed with driving the vehicle 168 with the park brake in the released position.

Returning to step 330, if the microcontroller 126 determines that the duration of time that the user pressed the park brake selector 214 satisfies the predetermined time threshold, such as, for example, being equal to or greater than one second, then at step 332 the microcontroller 126 can determine whether the hill assist feature is enabled or disabled. If the microcontroller 126 determines at step 332 that the hill assist feature is enabled, or on, the microcontroller 126 can toggle the engine 196 from being enabled to disabled so as to prevent driving of the vehicle 168 while the park brake 176 is at the set position. The microcontroller 126 can then also illuminate the dash light 192 to provide a visual indication to the driver that the park brake 176 is set.

If however at step 332 the microcontroller 126 determines that the hill assist feature is disabled, or off, then at step 336 the microcontroller 126 determines if the vehicle 168 is stopped, or alternatively, whether the vehicle 168 is moving. Thus, by pressing the park brake selector 214, the driver of the vehicle 168 has been able to release the park brake 176 and enable operation of the engine 196 of the vehicle 168 while the hill assist feature is off or disabled. If the vehicle 168 is not moving, then as shown in FIG. 7, the current process can come to completion, as indicated by the return to "START" in FIG. 7. However, if the microcontroller 126 instead determines that the vehicle 168 is stopped, then at step 338 the microcontroller 126 can determine the park brake status, and more specifically, whether the park brake 176 is at the set or released position. If the microcontroller 126 determines at step 338 that the park brake 176 is set, such that park brake 176 is engaged in manner that at least attempts to hold a position of the vehicle 168, then at step 340 the microcontroller 126 can release the park brake 176 and enable the engine 196 of the vehicle 168. According to certain embodiments, this process can include the microcontroller 126 generating a command that results in the driver controller 190 operating the driver 108 in a reverse direction so as to reduce tension in the cables 112a, 112b of the brake cables 110a, 110b. As the driver 108 is operated in reverse, the microcontroller 126 can count the pulses outputted from the encoder 124, and determine when the number of counted pulses reaches a predetermined threshold number of pulses that may be associated with the displacement of the park brake 176 reaching the running clearance position. Upon the microcontroller 126 determining the park brake 176 has reached the running clearance position, the microcontroller 126 can generate a signal for the driver controller 190 to end operation of the driver 108 in the reverse direction. Further, with the park brake 176 released, the microcontroller 126 can issue a signal that disables the dash light 192, as well as a signal to enable operation of the engine 196. The driver of the vehicle 168 can then proceed with driving the vehicle 168.

If however at step 338 the microcontroller 126 determines that the park brake 176 is at the release position, then at step 342 the microcontroller 126 can set the park brake 176 and disable the engine 196 of the vehicle 168. Such a feature allows for the park brake to be set and the engine 196 of the vehicle 168 to be disabled when the driver of the vehicle 168 presses the park brake selector 214 while the hill assist feature is off or disabled. According to certain embodiments, at step 342 the microcontroller 126 can generate a signal that commands the driver controller 190 to operate the driver 108 so as to facilitate displacement of the equalizer assembly 144 in a manner that increases tension in the cables 112a, 112b of the cable brakes 110a, 110b so that the park brake 176 provides frictional resistance against the rotation of the corresponding tire or wheel 172 of the vehicle 168. The microcontroller 126 may further command the driver controller 190 to provide the microcontroller 126 with an indication or measurement of the real-time current being drawn by the driver 108 as the driver 108 is being operated to set the park brake 176. As previously discussed, as the current drawn by the motor may increase as the tension being created in the cables 112a, 112b increases via the associated displacement of the equalizer assembly 144 along the rotating actuator 130, the real-time current level being drawn by the driver 108 can be correlated to the degree of frictional resistance being provided by the park brake 176 against the associated component of the tire or wheel 172. Thus, according to certain embodiments, the microcontroller 126 can compare the real-time current level provided by the driver controller 190 against a predetermined threshold current level. Upon the real-time current level meeting or exceeding the predetermined threshold current level, the microcontroller 126 can determine that the park brake 176 is at the set position. The microcontroller 126 can then instruct the driver controller 190 to cease operation of the driver 108, and thus stop rotation of the actuator 130 and the corresponding displacement of the equalizer assembly 144 along the actuator 130. The microcontroller 126 can then illuminate the dash light 192 so as to indicate that the park brake 176 is set, as well as disable the engine 196 so as to at least temporarily prevent driving of the vehicle 168.

Returning to step 312, if at step 312 the microcontroller 126 determines that the park brake 176 status corresponds to the park brake 176 being at the released position, then at step 344 the microcontroller 126 can determine whether the vehicle 168 is, or is not, stopped, or, similarly, whether the vehicle 168 is, or is not, moving. If the vehicle 168 is not stopped, and thus the vehicle 168 is moving, then as shown in FIG. 7, the current process can come to completion, as indicated by the return to "START" in FIG. 7. However, if the microcontroller 126 determines at step 344 that the vehicle 168 is stopped, or not moving, then at step 346 the microcontroller 126 can determine whether the accelerator 210 is in a down position or at an up position, as previously discussed. As also previously discussed, the position of the accelerator 210 can be determined in a number of manners, including, for example, via use of the accelerator position sensor 208. If at step 346 the microcontroller 126 determines that the accelerator 210 is in the down position, which can be associated with the driver 108 currently at least attempting to drive the vehicle 168, the current process can come to completion, as indicated in FIG. 7 by the return to "START".

If however at step 346 the microcontroller 126 determines that the accelerator 210 is in the up position, indicating that the driver is currently not operating the vehicle 168, then at step 348 the microcontroller 126 can set the park brake 176. Thus, at step 346, the driver of the vehicle 168 is able to set the park brake 176 while the hill assist feature is on, or enabled. According to certain embodiments, at step 348 the microcontroller 126 can generate a signal that commands the driver controller 190 to operate the driver 108 so as to facilitate rotation of the actuator 130, and thus linear displacement of the equalizer assembly 144 in a manner that increases tension in the cables 112a, 112b of the cable brakes 110a, 110b so that the park brake 176 provides frictional resistance against the rotation of the corresponding tire or wheel 172 of the vehicle 168. The microcontroller 126 may further command the driver controller 190 to provide the microcontroller 126 with an indication or measurement of the real-time current being drawn by the driver 108 as the driver 108 is being operated to set the park brake 176. As previously discussed, as the current drawn by the motor may increase as the tension being created in the cables 112a, 112b increases via the associated displacement of the equalizer assembly 144 along the rotating actuator 130, the real-time current level being drawn by the driver 108 can be correlated to the degree of frictional resistance being provided by the park brake 176 against the associated component of the tire or wheel 172. Thus, according to certain embodiments, the microcontroller 126 can compare the real-time current level provided by the driver controller 190 against a predetermined threshold current level. Upon the real-time current level meeting or exceeding the predetermined threshold current level, the microcontroller 126 can determine that the park brake 176 is at the set position. The microcontroller 126 can then instruct the driver controller 190 to cease operation of the driver 108, and thus stop the corresponding displacement of the equalizer assembly 144 along the actuator 130. Further, according to certain embodiments, the microcontroller 126 can then illuminate the dash light 192 so as to indicate that the park brake 176 is set, as well as disable the engine 196 so as to at least temporarily prevent driving of the vehicle 168. The current process can then come to completion, as indicated by the return to "START" in FIG. 7.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A park brake system for adjusting a tension in a brake cable that is coupled to a park brake, the park brake system comprising:
   a driver communicatively coupled to a microcontroller;
   an actuator having a thread portion, the actuator being rotatably displaceable by operation of the driver;
   an equalizer assembly having at least one extension and an internal thread, the at least one extension configured to be coupled to the brake cable, the equalizer assembly being linearly displaceable along the actuator when the actuator is rotatably displaced by a mating engagement between the internal thread and the thread portion of the actuator; and
   an encoder coupled to the driver, the encoder being communicatively coupled to the microcontroller and configured to output a signal that indicates at least one of a speed and a positon of an output shaft of the driver;
   wherein the microcontroller is configured to monitor a current being drawn by the driver as the driver is operated and generate instructions to cease the operation of the driver upon the current reaching a predetermined current threshold, the predetermined current threshold corresponding to a maximum force that is to be applied by the park brake, and wherein the microcontroller is configured to determine, using the output from the encoder, if the park brake has been displaced to a running clearance position where the park brake is separated from a wheel component by a distance that prevents the park brake from engaging the wheel component in a manner that can produce park drag.

2. The park brake system of claim 1, wherein each output signal contains a pulse, and wherein the microcontroller is configured to maintain a count of the pulses received from the encoder and cease the operation of the driver when the count satisfies a predetermined threshold number of pulses.

3. The park brake system of claim 1, wherein the driver is an electrical motor, and wherein the driver is coupled to the actuator by a plurality of gears, at least one gear of the plurality of gears being connected to a first shaft end of the actuator.

4. The park brake system of claim 3, further comprising:
   a release assembly coupled to a second shaft end of the actuator, the release assembly having a driver body configured to be matingly engaged by a tool, wherein the actuator is rotatable by rotation of the driver body to facilitate rotational displacement of the equalizer assembly.

5. The park brake system of claim 1, wherein the equalizer assembly includes a body portion having a cavity and a traveling nut, the traveling nut being secured within the cavity, the internal thread being positioned within the traveling nut, and wherein the at least one extension comprises a first extension and a second extension, the first and second extensions being positioned on opposing sides of the body portion.

6. A method comprising:
   rotating, in a first direction by operation of a driver, an actuator;
   linearly displacing an equalizer assembly in a first direction along a threaded portion of the rotated actuator;
   adjusting, by the linear displacement of the equalizer assembly in the first direction, a tension in a brake cable that is coupled to the equalizer assembly, wherein adjusting the tension in the brake cable adjusts a force being applied by a park brake that is coupled to the brake cable;
   monitoring a current drawn by the driver as the driver rotates the actuator;
   determining the current drawn by the driver satisfies a predetermined current threshold that corresponds to a maximum force that is to be applied by the park brake when the park brake is at a set position; and
   disabling an engine of a vehicle containing the park brake upon determining the current drawn satisfies the predetermined current threshold.

7. The method of claim 6, further comprising:
   rotating, in a second direction by the operation of the driver, the actuator;
   linearly displacing the equalizer assembly in a second direction along the threaded portion of the rotated actuator;
   decreasing, as the equalizer assembly is linearly displaced in the second direction, the tension in the brake cable, the decrease in the tension in the brake cable facilitating displacement of the park brake away from the set position;
   monitoring output signals from an encoder that is coupled to the driver as the driver rotates the actuator in the second direction; and ceasing the operation of the driver when the monitored output signals from the encoder satisfy a predetermined threshold, the predetermined threshold corresponding to the park brake being displaced to a running clearance position.

8. The method of claim 6, further comprising ceasing the operation of the driver upon determining the current drawn by the driver satisfies the predetermined current threshold, and wherein the driver is an electric motor and the brake cable comprises at least two brake cables.

9. The method of claim 6, wherein the actuator is rotated in response to an engagement of a park brake selector by a user of the vehicle containing the park brake.

10. The method of claim 9, further including determining if a duration of the engagement of the park brake selector satisfies a predetermined threshold, and, if the duration satisfies the predetermined threshold, the method further comprises initiating rotation of the actuator at a reduced speed while the vehicle is moving.

11. A method comprising:
determining a pitch of a vehicle containing a park brake;
estimating, using at least the determined pitch, a torque needed to be provided by an engine of the vehicle to prevent a rolling movement of the vehicle;
delaying rotation of an actuator until a torque generated by the engine meets or exceeds the estimated torque;
once the generated torque meets or exceeds the estimated torque, rotating, by operation of a driver and while the park brake of the vehicle is at a set position, the actuator;
linearly displacing an equalizer assembly along a threaded portion of the rotated actuator;
decreasing, as the equalizer assembly is linearly displaced, a tension in a brake cable that is coupled to the park brake, the decrease in the tension in the brake cable facilitating displacement of the park brake away from the set position;
monitoring output signals from an encoder that is coupled to the driver as the driver rotates the actuator; and
ceasing the operation of the driver when the monitored output signals from the encoder satisfy a predetermined threshold, the predetermined threshold corresponding to the park brake being displaced to a running clearance position.

12. The method of claim 11, further comprising:
measuring the torque generated by the engine at an axle of the vehicle.

13. The method of claim 11, wherein determining the pitch of the vehicle containing the park brake comprises:
determining, prior to rotating the actuator, whether the vehicle is set to be driven in a first travel direction up an incline or a second travel direction down the incline, wherein the method further comprises:
wherein, if the vehicle is determined to be set for the second travel direction, the method further comprises releasing the park brake by initiating rotation of the actuator without determining if the generated torque meets or exceeds the estimated torque, and
wherein, if the vehicle is determined to be set for the first travel direction, the estimated torque is a torque needed to be provided by the engine of the vehicle to prevent downward rolling of the vehicle along the incline.

14. The method of claim 13, wherein determining whether the vehicle is set to be driven in the first travel direction or the second travel direction comprises:
determining whether the vehicle is set for travel in a forward driving gear or a reverse driving gear,
wherein the pitch of the vehicle provides an indication of whether the vehicle is positioned in an uphill direction or a downhill direction,
wherein the vehicle is determined to be set for the first travel direction if the vehicle is (1) positioned in the uphill direction and is in the forward driving gear, or (2) positioned in the downhill direction and is in the reverse driving gear, and
wherein the vehicle is determined to be set for the second travel direction if the vehicle is (1) positioned in the uphill direction and is in the reverse driving gear, or (2) positioned in the downhill direction and is in the forward driving gear.

15. The method of claim 11, further comprising:
determining whether an accelerator of the vehicle is at an up positon or a down position, and wherein the actuator is not operated until the accelerator is determined to be in the up position.

16. The method of claim 11, further including enabling operation of the engine of the vehicle upon the park brake being displaced to the running clearance position.

17. The park brake system of claim 1, further comprising:
a housing having a series of sidewalls, the driver being at least partially disposed within the housing such that a portion of the driver extends through at least one sidewall of the series of sidewalls of the housing, the actuator being at least partially disposed within the housing such that a portion of the actuator extends through the at least one sidewall of the series of sidewalls of the housing, and the equalizer assembly being disposed within the housing such that the equalizer assembly is linearly displaced through an interior of the housing when the equalizer assembly is linearly displaced along the actuator.

18. The park brake system of claim 17, wherein the brake cable extends through an orifice in at least one sidewall of the series of sidewalls of the housing such that the brake cable is coupled to the equalizer assembly within the housing.

19. The park brake system of claim 1, wherein the microcontroller is configured to generate instructions to cease the operation of the driver upon determining that the park brake has been displaced to the running clearance position.

20. The method of claim 11, wherein the running clearance position is a position at which the park brake is separated from a wheel component by a distance that prevents the park brake from engaging the wheel component in a manner that can produce park drag.

* * * * *